United States Patent
Mittig et al.

(10) Patent No.: US 10,091,223 B2
(45) Date of Patent: Oct. 2, 2018

(54) METHOD FOR DETECTING ANOMALIES IN NETWORK TRAFFIC

(71) Applicant: ORANGE, Paris (FR)

(72) Inventors: Karel Mittig, Caen (FR); Fabien Bignon, Caen (FR)

(73) Assignee: Orange, Paris (FR)

( * ) Notice: Subject to any disclaimer, the term of this patent is extended or adjusted under 35 U.S.C. 154(b) by 205 days.

(21) Appl. No.: 14/917,258

(22) PCT Filed: Sep. 25, 2014

(86) PCT No.: PCT/FR2014/052403
§ 371 (c)(1),
(2) Date: Mar. 7, 2016

(87) PCT Pub. No.: WO2015/044595
PCT Pub. Date: Apr. 2, 2015

(65) Prior Publication Data
US 2016/0219069 A1    Jul. 28, 2016

(30) Foreign Application Priority Data

Sep. 30, 2013   (FR) ..................... 13 59461

(51) Int. Cl.
*H04L 29/06*    (2006.01)
(52) U.S. Cl.
CPC ...... *H04L 63/1425* (2013.01); *H04L 63/1416* (2013.01)
(58) Field of Classification Search
CPC ...................... H04L 63/14–63/1425
See application file for complete search history.

(56) References Cited

U.S. PATENT DOCUMENTS

| | | | |
|---|---|---|---|
| 8,381,299 B2* | 2/2013 | Stolfo | G06F 21/564 726/24 |
| 2004/0064738 A1 | 4/2004 | Kanno et al. | |
| 2006/0179040 A1 | 8/2006 | Bird et al. | |
| 2012/0036577 A1* | 2/2012 | Bolzoni | H04L 43/00 726/23 |

OTHER PUBLICATIONS

Parthasarathy et al., Bloom Filter Based Intrusion Detection for Smart Grid SCADA, IEEE, 2012.*
Wang et al., Anagram: A Content Anomaly Detector Resistant to Mimicry Attack, Heidelberg, 2006.*
Written Opinion for the application PCT/FR2014/052403.

* cited by examiner

*Primary Examiner* — Minh Dinh
(74) *Attorney, Agent, or Firm* — Haverstock & Owens LLP

(57) ABSTRACT

The invention concerns a method for detecting anomalies in network traffic, said traffic being transmitted by a server (10) in response to requests from at least one client device (11), the method comprising: —a step (E10) of receiving a request, said request being of a given type, —a step (E11) of receiving a response to the request, —a step (E13) of constructing a current bit vector ($V_N$), representative of the response, —a step (E17) of calculating a similarity index representative of a distance between the current bit vector and a model bit vector (Vmod) associated with the request type, —a step of checking (E18) that the similarity index (Isc) does not belong to a compliance interval (IC) calculated for the request type, an anomaly being detected when the similarity index does not belong to the compliance interval.

12 Claims, 3 Drawing Sheets

METHOD FOR DETECTING ANOMALIES IN NETWORK TRAFFIC

The invention relates to the general field of telecommunications. It relates, more particularly, to data processing security and relates to a method for detecting anomalies in network traffic.

The invention has a particularly advantageous application in the framework of the detection and of the prevention of intrusions into networks and service platforms. An intrusion into a network or a service platform constitutes a serious risk for companies since it may be the source of leaks of confidential data, such as customer data, competitor information. Such attacks can have significant financial consequences for the company and, in any case, can be detrimental to the reputation of the company.

Numerous methods have been developed with the aim of detecting such intrusions. Some are implemented during the design phase of a system, others once the system has been developed, by means of attack detection equipment. However, the methods implemented in the design phase are extremely complex and costly to implement, notably when numerous actors are involved. With regard to the detection methods once the system has been designed, they are not infallible and are known for being very sensitive to false positives. Other approaches are also known consisting in analyzing responses to requests made from a server in order to detect the presence of sensitive information in the responses. This method is better known by the name data leakage detection method, or DLP (for Data Leakage Protection). For example, such a method will detect signatures corresponding to numbers of credit cards and will block responses to requests when the responses contain this type of information.

However, such a method is faced with some performance problems. This is because the volume of responses is, on average, twenty times higher than the volume of requests. Thus, an analysis of the responses to the requests is costly in terms of processing time, on the one hand, and in terms of memory load, on the other. There therefore exist few implementations of techniques for detection of intrusions based on this approach.

One of the aims of the invention is to overcome shortcomings/drawbacks of the prior art and/or to provide improvements for them.

For this purpose, the invention provides a method for detecting anomalies in network traffic, said traffic being transmitted by a server in response to requests from at least one client device, the method comprising:

a step for receiving a request, said request being of a given type,
a step for receiving a response to the request,
a step for constructing a current bit array, representative of the response,
a step for calculating a similarity index representative of a distance between the current bit array and a model bit array associated with the type of the request,
a step for verifying that the similarity index belongs to a compliance interval calculated for the type of request, an anomaly being detected when the similarity index does not belong to the compliance interval.

The method described, based on a modeling and an analysis in real time of the responses from an application server, allows abnormal responses to be detected that are characteristic of an anomaly associated with an attack or with an abnormal behavior of an application. The method allows the size of memory needed for this real-time analysis, together with the processing power, to be optimized. Indeed, the method is based on a binary representation of responses to requests and does not require the responses to be stored in memory once their representation has been constructed; the gain in memory space is considerable. Furthermore, the calculation of data used by the method, together with the comparisons needed for detecting an abnormal behavior, are based on these binary representations. The processing power required is therefore less than when the responses are manipulated in their original form.

Furthermore, the method allows an information leakage to be detected in a more generic manner than known methods based on the DLP approach. Indeed, the known methods are designed to detect precise pieces of information, such as individual card numbers, in responses to requests and to block responses which comprise this information. In contrast, the method provided here allows generic information to be detected, such as types of information like for example account numbers or passwords. Indeed, in the method allowing an abnormal response with respect to an normal operation of the application to be detected, any abnormal form of response is detected. For example, if requests allow an e-mail address belonging to a user named in the request to be obtained, a response comprising more than one e-mail address, following a malicious request, will be detected as abnormal. The method also allows an anomaly different from a data leakage to be detected. Such an anomaly is detected when the similarity index is greater than the upper limit of the compliance interval. In this case, the response comes close to the model bit array theoretically calculated, which is incompatible with a dynamic behavior of the service.

Furthermore, the present method does not interfere with services intended to provide sensitive information in response to requests since it relies on the detection of a behavior deviating from a modeling of the normal operation of the service. The method does not therefore take into account the sensitivity of the data which must be sent in response to requests, but the form of the responses normally sent.

According to one exemplary embodiment, the method comprises a learning phase which comprises:

a step for receiving an initial request, the initial request being of the given type,
a step for receiving an initial response to the initial request,
a step for constructing a model bit array, representative of the initial response,
a step for updating the model array based on a subsequent bit array, constructed using a next response received following a next request of the given type,
a step for calculating a similarity index between the updated model array and the following bit array, the steps for updating and calculating the similarity index being iterated at least once,
a step for calculating a mean of the calculated similarity indices and a standard deviation of these indices,
a step for calculating the compliance interval based on the mean of the indices and on the standard deviation.

The method comprises a learning phase needed for the calculation of the indicators used in the detection phase, here the model bit array, the similarity indices, their mean and the standard deviation between these indices and the variability threshold which represents a variability tolerated for responses to requests of a given type.

Advantageously, the compliance interval is defined by means of the mean $M_{IS}$, of the calculated similarity indices and of the standard deviation $\sigma_{IS}$ of these indices, according to the following formula:

$$IC=[M_{IS}-3*\sigma, M_{IS}+3*\sigma]$$

The formula for calculating the compliance interval allows the number of false positives, in other words responses to requests which would be identified as abnormal whereas in reality these responses are normal, to be greatly reduced. Indeed, the standard deviation and the mean allow an interval to be determined within which the majority of a population of a sample of values is found. In this case, it is known that the distribution of the values of a sample conforms to a graphical representation of a normal law and that, within an interval $[-3*\sigma_{IS},+3*\sigma_{IS}]$ around the mean, 98% of the distribution of the sample is found. The majority of the normal responses therefore belong to this compliance interval; it is not therefore detected as abnormal by the method.

In one exemplary embodiment, the construction of a bit array based on a response to a request comprises the following steps:
- decomposition of the response into words composing it,
- calculation of a position Pj, 1≤j≤n, within the bit array, said position being associated with one of the words by implementating the following steps:
  - conversion of said word into a binary form,
  - obtaining the position Pj within the array by application modulo n of a hash function to said binary form obtained, and
  - positioning the Pj-th bit at 1.

The method discloses how to represent the responses to requests of a given type by a bit array where each word of the response is represented by a bit from a given position within the array. Such a representation contributes to the gain in the memory space used for the implementation of the method.

Advantageously, the method also comprises a filtering step during which a filtering bit array comprising a representation of a set of non-significant words is subtracted from the model array and from the next bit array prior to the updating of the model array based on the next bit array.

An array representative of a non-significant vocabulary is constructed and subtracted from the manipulated bit arrays. Thus, the manipulated bit arrays, whether this be the model array or the following arrays, are only representative of data, in other words of words, semantically significant in the framework of the application security. It will be understood that, in this case, all the indicators calculated from bit arrays are defined more finely than when a non-significant vocabulary is represented. The method allows a finer detection of the abnormal responses. Furthermore, aside from the non-significant vocabularies, there is an additional gain in memory space.

In one exemplary embodiment, the size of the bit array is a number of bytes in the range between 4 Kbits and 400 Kbits.

The size of the bit arrays is in the range between a minimum value of 4 Kbits, which allows two thousand eight hundred words to be represented, and a maximum value of 400 Kbits which corresponds to a reasonable value with respect to the memory capacity of a system. It should be noted that a normal conversation uses approximately two thousand words. Thus, the range of values provided allows the method to be best configured to take into account capacities of the system and requirements inherent to the service in question.

In one exemplary embodiment, an order of magnitude of the size of the bit array is 5% of a mean size of responses to requests.

The size of the bit arrays used to represent the responses to the requests of a given type, whether this is in the learning phase or in the detection phase, is fixed in such a manner that the probability of having a collision within a bit array is extremely low. There is a collision when two different words of a response to a request are represented by the same bit in a bit array. Thus, the binary representation is reliable and for this reason contributes to the reliability of the method.

In one exemplary embodiment, the steps of the learning phase are implemented according to a given frequency over a given period.

A time-domain sampling for implementing the learning phase is advantageous in the case of a service whose time variation is known. For example, in the case of a web service whose home page varies over time, according to a known frequency, it is advantageous to sample, in other words to model responses to requests of a given type, according to the same frequency of variation of the service. The sampling is therefore carried out as a function of the variation of the service over time. This allows an efficient learning phase to be implemented and contributes to the reliability of the method.

In one exemplary embodiment, the number of iterations of the steps in the learning phase is determined dynamically by comparing standard deviations obtained between an m-th iteration and (m−1)-th and (m−2)-th iterations, with m>4, the number of iterations being sufficient when a variation of the standard deviations obtained is less than a given value.

Thus, the number of iterations is defined dynamically and allows a model array and a reliable and precise compliance interval to be obtained with an optimum number of iterations.

Advantageously, the method comprises a step for comparison of the model bit array and the current bit array, implemented when the standard deviation calculated in the learning phase is equal to zero, an alarm being raised when the arrays are different.

Thus, the detection method allows an attack of the site defacement type to be detected. Indeed, when the service provided by the server is a web service for accessing a site with static content, the smallest difference between the current bit array constructed subsequent to a request from the server and the model bit array constructed in the learning phase generates an alarm. Indeed, in the case of an access to a site whose content is recognized as being static, the standard deviation calculated in the learning phase is zero since all the following bit arrays calculated using the following responses are identical to the model bit array. Thus, it has been identified in the learning phase that, for a given type of request, the responses were all identical. A variation of a response to a request of the given type in the detection phase is therefore indicative of a modification of the site and hence of an attack.

The invention also relates to a device for detecting anomalies in network traffic, said traffic being transmitted by a server in response to requests from a client device, the device comprising:
- receiving means, intended to receive a request, said request being of a given type, and to receive a response to the request, construction means, intended to construct a current bit array, representative of the response, calculation means, intended to calculate a similarity index representative of a distance between the current bit array and a model bit array associated with the type of the request, verification means, intended to check that the similarity index does not belong to a compliance interval calculated for the type of request, an anomaly being detected when the similarity index does not belong to the compliance interval.

The invention also relates to a computer program intended to be installed in a memory of a computer, comprising instructions for the implementation of the steps of the method for detecting anomalies in network traffic according to the invention, when the program is executed by a processor.

Lastly, the invention also relates to a data medium on which the program according to the invention is recorded.

Others features and advantages of the present invention will be better understood from the description and from the appended drawings amongst which:

Figure 1:
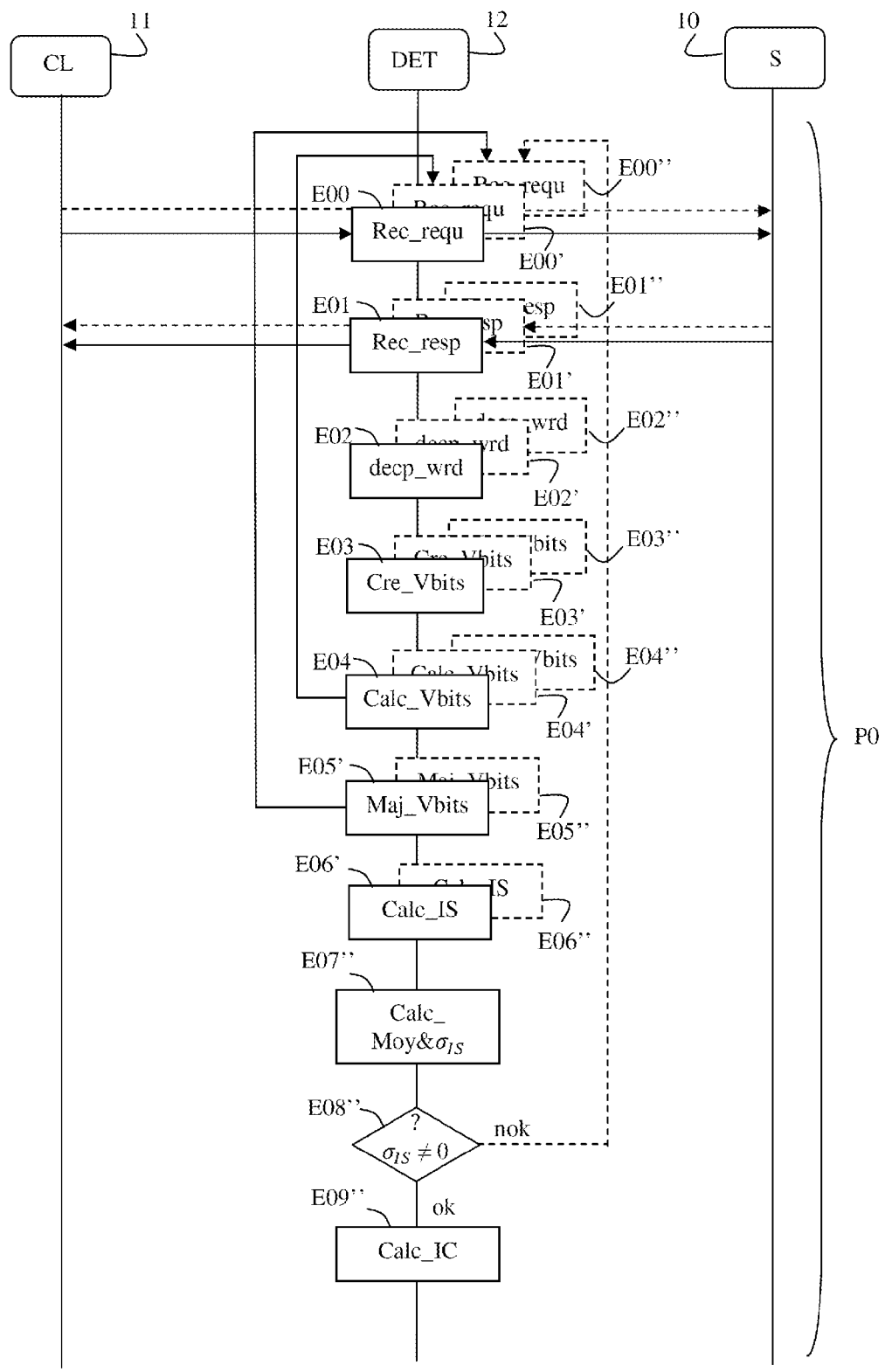
FIG. 1 shows the steps of a learning phase of a method for detecting anomalies in network traffic, according to a first exemplary embodiment.

The steps of a method for detecting an anomaly in network traffic, according to one exemplary embodiment of the invention, will now be described in relation with FIGS. 1 and 2.

A server 10 capable of providing a service stores sensitive data in a memory not shown. The service is for example a web service. The sensitive data are for example data specific to users, such as e-mail addresses, account numbers, passwords, etc. The server 10 can be interrogated remotely by a client device 11, via a network, for example the Internet, with the aim of providing a given service. For example, the service allows the client device 11 to interrogate the server 10 by supplying the surname and first name of a user, and to obtain in response the e-mail address of the user. Detection equipment 12, placed as a control switch between the client device 11 and the server 10, stores an application (not shown in FIG. 1) which comprises code instructions for implementing the steps of the method for detecting anomalies described here.

The method for detecting anomalies in network traffic comprises two phases:

a learning phase P0, aimed at constructing a model bit array representative of the responses received from the server 10 in response to a given type of request. The steps of the learning phase, according to one exemplary embodiment, are described in relation with FIG. 1;

a detection phase P1, during which a response to a request of the given type is compared with the model bit array constructed and updated during the learning phase and an anomaly is detected when the response to the request differs from a compliance interval constructed for this model. The steps of the detection phase, according to one exemplary embodiment of the invention are described in relation with FIG. 2.

In the exemplary embodiment described here, the learning phase P0 is implemented in a secure environment, in other words in an environment where it is assumed that the requests which are sent to the server 10 by the client device 11 and the responses received during this phase are correct. On the contrary, the detection phase P1 is implemented in an operational environment. In this environment, requests could be sent from pirate client devices 11 attempting to perpetrate attacks against the server 10. However, for reasons of simplification, the same client device 11 appears in FIGS. 1 and 2.

The learning phase P0 comprises a plurality of steps, iterated a given number of times in order to establish, based on a sample of several responses received following several requests of a given type, a response model specific to this type of request. These iterations are designed to refine indicators that will be used for detecting anomalies during the later detection phase P1.

Thus, in an initial receiving step E00 of the learning phase P0, the detection equipment 12 receives a request originating from the client device 11 and destined for the server 10. It stores a type of request associated with the request and re-transmits the request to the server 10. The type of request associated with the request is defined as being representative of a request, or common to a plurality of requests. Thus, in the example of an access to a web service allowing an e-mail associated with a name of a given user to be obtained, a request is of the form: "http://www.webservice.com/application/form1?user=name1", where "name1" states the name of the person whose e-mail address it is desired to obtain. The associated type of request is then of the form "http://www.webservice.com/application/form1". In other words, the request corresponds to an instantiation of the type of the request.

In a response step E01, the detection equipment 12 receives from the server 10 a response to the request previously received and destined for the client device 11. It stores this response and re-transmits it to the client device 11.

In a step E02 for decomposition of the response, the detection device 12 decomposes the response received during the step E01 into words composing it. In one exemplary embodiment, the decomposition of the response received into words is based on syntactic notions and uses separator characters such as spaces and punctuation signs such as full stops, commas, hyphens, etc. It is assumed that the response is composed of p words.

In a following step E03 for creation of a bit array, the detection device 12 generates an initial model array of n bits, denoted $V_{mod}$, for the response received. The model array $V_{mod}$ is initialized at zero. Its purpose is to model, in the form of a bit array, the responses received in response to the requests of the given type.

In a next step E04 for calculation of the array, the detection device 12 calculates the model array $V_{mod}$ based on the various words composing the response received and which have been obtained during the decomposition step E02. Each word $M_i$, $1 \leq i \leq p$, of the response is thus converted to binary format based on the digital value of the characters composing it. A hash function H is subsequently applied to each word $M_i$ in binary format in order to obtain a trace $E_i$ of the word $M_i$ in the form of a digital value. A position $P_j$, $1 \leq j \leq n$, in the model array $V_{mod}$ is subsequently associated with each of the traces $E_i$ generated, according to the following formula: $P_j = H(M_i) \bmod n$. In other words, the position $P_j$ in the model array $V_{mod}$ is obtained by applying the hash function H to the word $M_i$, modulo the size n of the array $V_{mod}$. The Pj-th bit $B_j$ of the model array $V_{mod}$ is then positioned at 1. Thus, a bit positioned at 1 in the Pj-th position is representative of the presence of the word $M_i$ in the response to the request. In one exemplary embodiment, the hash function H is the function SHA-1 (for Secure Hashing Algorithm-1). The invention is of course not limited to this function and other exemplary embodiments of the functions such as SHA-2, MD-5 (for Message Digest-5) may be used.

The size n of the model array $V_{mod}$ is chosen in such a manner that the probability of having collisions at the positions $P_j$, in other words of having two different words represented by the same bit, is low. The use of a bit array to represent the words that compose the response to the request allows an inventory to be established of the words that compose the response excluding double words. Indeed, if a word appears several times in the response, it is represented by the same bit in the model array $V_{mod}$. Furthermore, it will be understood that, with such a representation, it is not necessary to store the words that compose the response. Moreover, a word of any given length is always represented by one bit. It will be understood that the gain in memory space for the detection device 12 is non-negligible.

The model array $V_{mod}$ is subsequently refined by iterating the preceding steps. The subsequent iterations are intended to calculate indicators specific to each of the types of requests.

Thus, in a second iteration of the steps E00 to E04, denoted E00' to E04', a second request, sent to the server 10, is received by the detection device 12 and re-transmitted to the server 10. It is assumed that the second request is different from the request received during the step E00 but that the type of the second request is the same as the type of the request received during the step E00. In other words, the second request is of the form "http://www.webservice.com/application/form1?user=name:2"; it is therefore of the same type as the request of the form "http://www.webservice.com/application/form1" but relates to another user. In a response step E01', similar to the step E01, the response to the second request, called second response, is received and stored by the detection device 12 then transmitted to the client device 11. In a step E02' for decomposition of the response, similar to the step E02, the second response is decomposed into words. In a step E03' for creation of the bit array, a second bit array $V_2$ is generated and initialized at zero. Lastly, in a step E04' for calculating the array, similar to the preceding step E04, the second bit array $V_2$ is calculated based on the words that compose the second response, in the same way as the model array $V_{mod}$.

In a step E05' for updating the model array, the model array $V_{mod}$ calculated during the step E04 is updated. For this purpose, the logical operator AND is applied to the arrays $V_{mod}$ and $V_2$. In other words, the model array $V_{mod}$ is updated according to the following formula: $V_{mod}=V_{mod}$ AND $V_2$. As a reminder, the logical operator AND results in a 1 if, and only if, the two ANDed bits themselves have the value 1. The updated model array $V_{mod}$ therefore represents the intersection between the two arrays $V_{mod}$ and $V_2$ and hence corresponds to a content of the response present in the two responses being compared.

In a step E06' for calculating a similarity index, a similarity index IS is calculated between the model array $V_{mod}$ thus obtained and the second array $V_2$. This similarity index IS corresponds to the distance between the two arrays $V_{mod}$ and $V_2$; it can be calculated as the sum of the common elements between the two arrays, minus the sum of the different elements, divided by the size of the arrays in question. In other words:

$$IS = \frac{\sum \text{identical elements}(V_{mod}, V_2) - \sum \text{different elements}(V_{mod}, V_2)}{n}$$

The steps E00' to E06' are iterated a predefined number of times. Thus, during a next iteration, the device 11 receives a next response following a next request from the client device 11 to the server 10. It is assumed that the next request is of the same type as the preceding requests. In a step E02", similar to the steps E02 and E02', the next response is decomposed into words. In a step E03", similar to the steps E03 and E03', a next bit array $V_S$ is generated and initialized at zero. Finally, in a step E04", similar to the preceding steps E04 and E04', the next array $V_S$ is calculated based on the words that compose the third response, in the same way as the arrays $V_{mod}$ and $V_2$.

In a step E05" for updating the model array, the model array $V_{mod}$, obtained during the preceding step E05', is updated. The logical operator AND is applied to the arrays $V_{mod}$ and $V_S$. In other words, $V_{mod}=V_{mod}$ AND $V_S$ is calculated. The updated model array $V_{mod}$ represents the intersection between the three arrays $V_{mod}$ and $V_2$ and $V_S$ and hence corresponds to a content present in the responses being compared. It will be understood that, with these successive iterations, the model array $V_{mod}$ is refined by virtue of the successive updates.

In a step E06" for calculating a new similarity index, a next similarity index IS' is calculated between the model array $V_{mod}$ thus obtained and the next array $V_S$. This next similarity index IS' corresponds to the distance between the two arrays $V_{mod}$ and $V_S$. It can be calculated as the sum of the common elements, minus the sum of the different elements, divided by the size of the arrays in question. In other words:

$$IS' = \frac{\sum \text{identical elements}(V_{mod}, V_s) - \sum \text{different elements}(V_{mod}, V_s)}{n}$$

In a following step E07" for calculating a mean and a standard deviation, a mean $M_{IS}$ of the similarity indices obtained during the steps E06' and E06" is calculated, together with the standard deviation $\sigma_{IS}$ of these indices. It is known that the standard deviation measures the variation of variables, here the similarity indices, with respect to the mean.

In a test step E08", it is checked whether the standard deviation $\sigma_{IS}$ is different from zero. In a first case where the standard deviation $\sigma_{IS}$ is different from zero (branch "ok" in FIG. 1), then, in a step E09" for calculating a compliance interval, a first variability threshold $T_{mod\_inf}$ and a second variability threshold $T_{mod\_sup}$ are calculated, which respectively constitute the upper and lower limits of a compliance interval representative of the conformity of a response to the model array calculated for this type of request, as a function of the divergence measured between the responses received. In one exemplary embodiment, the first variability threshold $T_{mod\_inf}$ is calculated according to the following formula:

$$T_{mod\_inf} = M_{IS} - 3*\sigma_{IS}$$

The second variability threshold $T_{mod\_sup}$ is calculated according to the following formula:

$$T_{mod\_sup} = M_{IS} + 3*\sigma_{IS}$$

The first and the second thresholds $T_{mod\_inf}$, $T_{mod\_sup}$ constitute the lower and upper limits of the compliance interval IC. In other words:

$$IC=[T_{mod\_inf}, T_{mod\_sup}]$$

The compliance interval IC represents, for a given type of request, a measurement according to which a content received in response to a request of this type corresponds to an expected response. Thus, a response to a request of the given type must be sufficiently close to the model array in order to be considered as a normal or expected response for this type of request.

The calculation formula provided hereinabove allows the number of false positives to be greatly reduced. A false positive corresponds to a response to a request of a given type which is judged to be an anomaly, whereas, in reality, it is not anomalous. Indeed, it is known that the standard deviation and the mean allow an interval to be determined within which the majority of a population of a sample of values is found. In this case, it is known that the distribution of the values of a sample conforms to a graphical representation of a normal law and that 98% of the distribution of the sample is found within an interval $[-3*\sigma_{IS}, +3*\sigma_{IS}]$ around the mean.

In a second case where the standard deviation $\sigma_{IS}$ is zero (branch "nok" in FIG. 1), corresponding to a case where the responses analyzed during the learning phase are all identical, the learning phase is operated for a maximum number of iterations. In other words, the steps E00" to E08" are iterated for the maximum number of iterations. If the maximum number of iterations is reached and the standard deviation $\sigma_{IS}$ is still zero, then the learning phase is interrupted. In this case, all the bit arrays generated from responses to the requests of the same type are strictly identical to the initial model array $V_{mod}$ generated during the step E04 for calculating the array. This means that the content of the responses is static. In other words, for this type of request, all the responses are identical.

The learning process described here implements, for a request of the same type, an iteration of the steps E00 to E04 designed to calculate the initial model array $V_{mod}$, and at least two successive iterations of the steps E00' to E06' designed to update the model array $V_{mod}$ and to calculate similarity indices between the new arrays calculated during the steps E04' and E04" and the model array $V_{mod}$. This number of iterations is a minimum number for calculating a mean and a standard deviation of the similarity indices. However, the invention is not limited to this number of iterations. Thus, in another exemplary embodiment, around ten or twenty iterations of the steps E00' to E06' or E00" to E06" are carried out in order to best refine the values of the mean and of the standard deviation used to calculate the first and second variability thresholds $T_{mod\_inf}$ and $T_{mod\_sup}$.

In the exemplary embodiment described here, the iterations are implemented for each request of a given type. In one variant embodiment, the successive iterations are implemented according to a given frequency. For example, one iteration of the steps E00' to E06' or E00" to E06" is carried out per day for a given period of time, for example one month. Proceeding thus for implementing the learning phase P0 can prove to be advantageous in the case of a web service which regularly updates its home page, for example on a daily basis. In another exemplary embodiment, the iterations will be distributed over a period of twenty-four hours in order to take into account known variations in the service over this period.

In another exemplary embodiment, the number of iterations is determined dynamically by comparing the standard deviation obtained between an m-th iteration and the two preceding iterations, in other words the (m−1)-th and (m−2)-th iterations, m>4. If the variation between these three values of standard deviation is less than a given value, then the model array is considered as constructed. The given value is for example of the order of two percent. Indeed, in this case, it is deemed that the model array calculated based on the preceding iterations is already sufficiently precise.

In the embodiment described here, the steps E02, E02', E02" for creating the bit array use punctuation signs for decomposing the received response into words. The invention is not limited to punctuation signs. Thus, in another exemplary embodiment, linguistic notions such as Chinese or Japanese kanji, kana or romaji may be used for decomposing the response into words. In another exemplary embodiment, data processing notions such as an encoding and a value of the characters used may be used.

In the exemplary embodiment described here, it is not stated what is the value n corresponding to the size of the bit arrays used to represent the initial model array $V_{mod}$ and the arrays obtained based on the responses analyzed during the iterations following the construction of the initial model array $V_{mod}$. An array, whether this be the initial model array, the updated model array $V_{mod}$, or the array obtained based on the analysis of a response, is assumed to represent, by means of bits, a set of words which constitute a response to a request. In a way, an array is intended to model a dictionary of words. It is known that a current conversation involves the use of around two thousand words. Thus, n is chosen in such a manner to be in the range between 4000 and 400000, or 4 Kbits≤n≤400 Kbits. The value of n, included within the interval hereinabove, may be refined and fixed as a function of the mean size of the responses to the requests. Thus, it has been determined empirically that n could be fixed at 5% of the mean size of the responses, more precisely at a number of Kbits close to 5% of the mean size of the responses. The determination of the size n of the arrays intended to represent the responses to the requests allows collisions during the representation of the words of a response within the array to be avoided. A collision occurs when the same position k within a bit array is associated with two different words $M_p$ and $M_q$, p≠q. In other words, there is a collision when $P_k=H(M_p) \bmod n=H(M_q) \bmod n$.

Furthermore, it is deemed that the value of n is insufficient whenever an array designed to represent a response is filled up to 70%, in other words when 70% of its bits are positioned at 1. Thus, when the learning phase P0 is implemented, it could be detected that the dimensioning of the bit arrays is insufficient by verifying the fraction of bits positioned at 1 in the arrays intended to represent responses. If this fraction is greater than 70%, the learning phase P0 is interrupted, the size of the bit arrays is doubled and a new learning phase P0 is implemented.

In one exemplary embodiment, and in order to exclude a non-significant vocabulary in responses to requests, a filtering array $V_{dict}$ representative of the non-significant vocabulary is subtracted from the various arrays constructed during the learning phase, in other words the model array $V_{mod}$ and the new arrays $V_2$, $V_S$, etc. The filtering array $V_{dict}$ is constructed in the same manner as the model array $V_{mod}$ and the arrays $V_2$, $V_S$, based on a dictionary of words judged to be non-significant in a content. For example, in the case of requests and responses associated with the HTML (for Hyper Text Transfer Protocol) format, the dictionary used for constructing the filtering array comprises HTML beacons such as "a", "href", "img", "class", etc. Indeed, these beacons are not significant from a semantic point of view. Thus, for the various words included in the dictionary, a binary form is obtained, then the hash function H is applied to the binary form obtained, modulo n. The value obtained corresponds to a position $P_k$ within the filtering array $V_{dict}$. The bit situated in the $P_k$-th position is then positioned at 1.

The filtering array $V_{dict}$ is subsequently used during the learning phase P0. The filtering array $V_{dict}$ is thus subtracted from each of the manipulated arrays. Thus, during the step E04 for calculating the model array, the filtering array $V_{dict}$ is subtracted from the initial model array $V_{mod}$. The filtering array $V_{dict}$ is also subtracted from the bit arrays $V_2$ and $V_S$ obtained during the steps E04' and E04". The subtraction of the filtering array $V_{dict}$ from a current bit array $V_{cour}$ in order to obtain a resultant array $V_{res}$ may be implemented by applying an AND operation followed by an EXCLUSIVE OR (or XOR) operation. In other words:

$$V_{res}=(V_{cour} \text{ AND } V_{dict}) \text{ XOR } V_{cour}$$

Filtering a non-significant vocabulary allows the memory space required for storing the bit arrays $V_{mod}$, $V_2$ and $V_S$ to be optimized. Furthermore, when the mean and standard deviation used for the calculation of the variability thresholds $T_{mod\_inf}$ and $T_{mod\_sup}$ are calculated, the words semantically non-significant in terms of security are thus eliminated. It will be understood that the compliance interval IC established using the variability thresholds thus calculated is more precise than if it is established using indicators based on contents which take into account, amongst other things, non-significant words.

The detection phase P1 of the detection method, according to one exemplary embodiment of the invention, will now be described in relation with FIG. 2.

Figure 2:
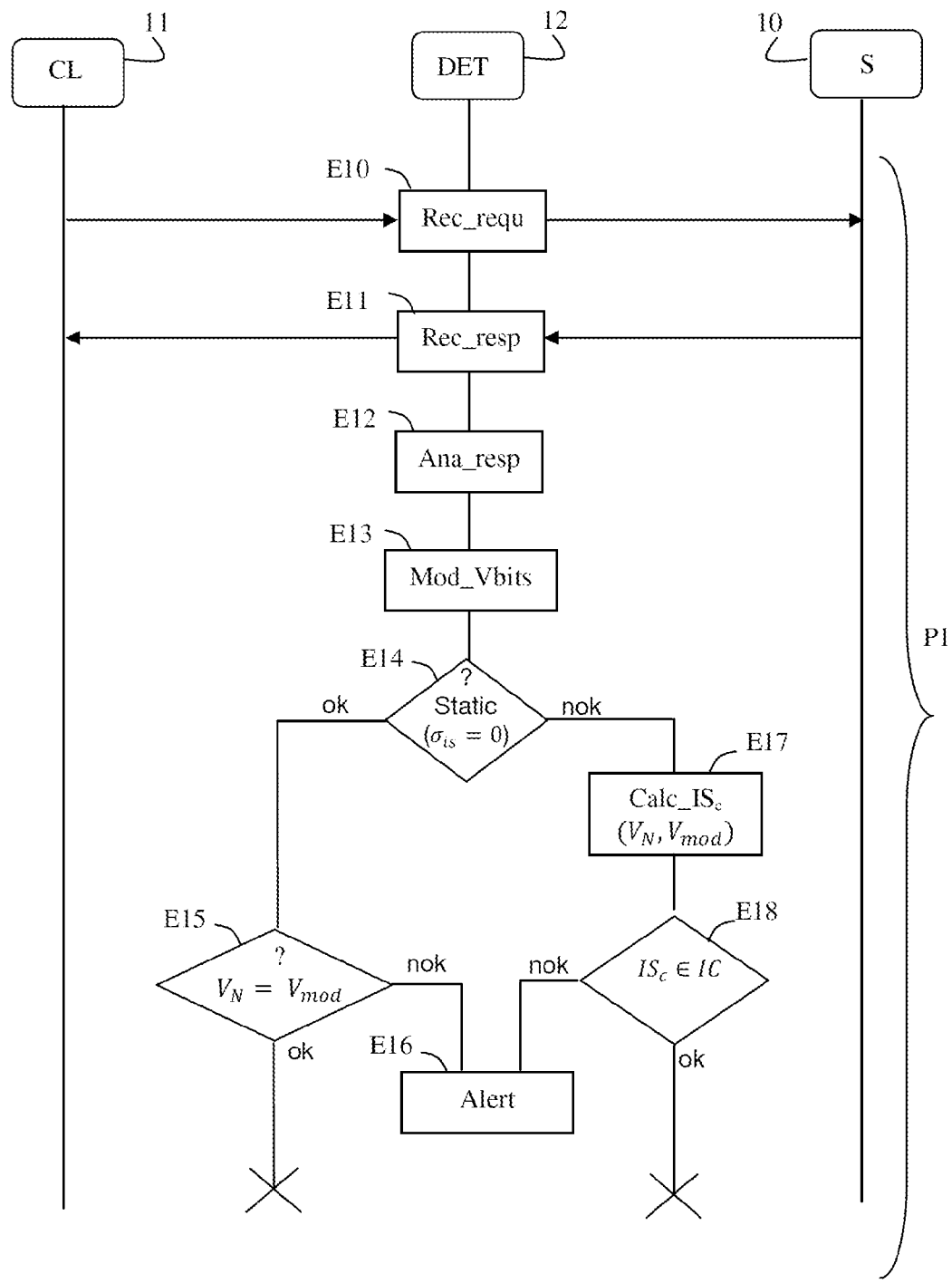
FIG. 2 shows the steps of a detection phase of the method for detecting anomalies, according to one exemplary embodiment.

It is considered, at this stage, that the learning phase described in relation with FIG. 1 has been implemented and that, for each type of request that the server 10 can process, a compliance interval IC is calculated that is representative of a distance tolerated between a response sent subsequent to a request of the same type and a response model calculated for this type of request.

In an initial interrogation step E10 of the detection phase P1, the detection device 12 receives a request coming from the client device 11 and destined for the server 10. The detection device 12 stores the request and re-transmits it to the server 10.

In a next response step E11, the detection device 12 receives a response to the request from the server 10. The detection device 12 stores the response and re-transmits it to the client device 11.

In an analysis step E12, the type of the request leading to the sending of the response is analyzed and the compliance interval IC is obtained for this type of request and the model array $V_{mod}$ calculated for this type of request during the learning phase P0. As a reminder, the compliance interval IC is defined based on the first and on the second variability threshold $T_{mod\_inf}$ and $T_{mod\_sup}$: IC=[$T_{mod\_inf}$, $T_{mod\_sup}$].

In a step E13 for binary array modeling, a current binary array $V_N$ is calculated that is representative of the response received, in the same manner as during the steps for calculating the array E04 in the learning phase P0.

In a test step E14, it is checked whether the content of the responses has been identified as static during the test step E08" in the learning phase P0. As a reminder, the test carried out during the step E08" indicates that the content of the responses is static for a given type of request when the standard deviation of the similarity indices calculated during the step E07" for calculating a mean and a standard deviation is equal to zero.

In a first case where the content of the responses to the requests of the given type has been identified as static during the learning phase P0 (branch "ok" in FIG. 2), the model array $V_{mod}$ is compared with the current array $V_N$ in a comparison step E15. In a case where the two arrays are identical (branch "ok" in FIG. 2), the response received and modeled by the array $V_N$ is considered as normal. Indeed, in the case of a static content, it is normal for the current bit array $V_N$ to be identical to the model bit array $V_{mod}$ since two responses to a request of the same type are identical. The bit arrays that model these responses are therefore necessarily identical. In the opposite case (branch "nok" in FIG. 2), in other words in the case where the content associated with this type of request has been identified as static in the learning phase P0 and the current array $V_N$ calculated from the response received is not identical to the model array $V_{mod}$, then an alarm is raised during an alarm step E16. Indeed, in the case of a static content, all the responses to requests of the same type are assumed to be identical, which is not the case here. This hypothetical case is adapted to the detection of an attack on a web site during which a pirate has modified the presentation of the web site. Such an attack is usually referred to as "defacement".

In a case where the test carried out during the step E14 is negative (branch "nok" in FIG. 2), in other words in a case where the content of the responses to the requests of the given type has not been identified as static during the learning phase P0, then, during a step E17 for calculating a current similarity index, a current similarity index $IS_C$ between the model array $V_{mod}$ calculated during the learning phase and the current array $V_N$ is calculated.

In a step E18 for verification with regard to the compliance interval, it is verified that the current similarity index $IS_C$ is included within the compliance interval IC calculated during the learning phase P0 for the current type of request.

In a first case where the current similarity index $IS_C$ is included within the compliance interval IC (case "ok" in FIG. 2), in other words when the current similarity index $IS_C$ is greater than or equal to the first variability threshold $T_{mod\_inf}$ and less than or equal to the second variability threshold $T_{mod\_sup}$ then the current response is considered as normal. In the opposite case (branch "nok" in FIG. 2), an alarm is raised during the alarm step E16. Indeed, in this case, the difference between the response analyzed and the model array calculated in the learning phase P0 exceeds the threshold defined for this model array; the response is therefore considered as abnormal.

In the alarm step E16, the detection device 12 may for example block the traffic corresponding to responses to requests of this type.

In another exemplary embodiment (not shown in FIG. 1), during the alarm step E16, it is determined whether the current similarity index $IS_C$ is less than the first variability threshold $T_{mod\_inf}$ or greater than the second variability threshold $T_{mod\_sup}$, in order to refine the type of anomaly detected. In a first case where the current similarity index $IS_C$ is less than the first variability threshold $T_{mod\_inf}$ the anomaly is of the 'attack by data leakages' type. In the case of the example of the web service, this corresponds to a response analyzed which comprises a plurality of e-mail addresses of users. In this case, the response analyzed differs from the calculated model bit array by beyond what is tolerated. In a second case where the current similarity index $IS_C$ is greater than the second variability threshold $T_{mod\_sup}$, the anomaly is to be compared with an abnormal behavior of the service and can correspond to an attack which tends to render the service inoperative. Indeed, in this case, the response analyzed is very close to the model bit array constructed theoretically, which is not possible in the case of a dynamic service.

In one exemplary embodiment where the filter filtering array $V_{dict}$, intended to take into account a non-significant vocabulary, is used during the learning phase P0, this filter array is also used in the detection phase. Thus, in this case, the same filter array $V_{dict}$ as that used in the learning phase is subtracted from the binary current array $V_N$ during the step E13 for modeling as a binary array. Thus, the arrays $V_{mod}$ and $V_N$, which are compared in the comparison step E15, are comparable.

In the example of the requests to a web server intended to obtain the e-mail address of a user, a malicious request intercepted by the detection device 12 and emanating from an attacker may for example be of the following form: "http://www.webservice.com/application/form1?user=' OR 1=1--". This request is of the type: "http://www.webservice.com/application/form1" for which a model array $V_{mod}$ and a variability threshold $T_{mod}$ have been calculated during the learning phase P0. In response to this request, the unsecured server 10 will supply in response a set of data, for example the entirety of the e-mail addresses in its memory:

```
<html>
...
<h1>Result of your request</h1>
<p>name1.surname1@domain1 name2.surname2@domain2 ... </p>
...
</html>
```

In accordance with the steps of the detection phase described previously, the detection device 12 constructs a binary current array for this response during the step E13 for modeling as a binary array and, during the step E17, calculates its current similarity index with the model bit array. The analysis of the response resulting from the attack will lead to an abnormal variation of the current similarity index with respect to a 'normal' traffic for which the variability threshold has been calculated.

The invention is described here in the case of a web datastream. However, the invention is not limited to this scenario and may be applied for various protocols such as datastreams specific to database interrogations, SIP (for Session Initiation Protocol) datastreams used in the framework of voice-over-IP (for VoIP).

A detection device 12, according to one exemplary embodiment of the invention, will now be described in relation with FIG. 3.

Figure 3:
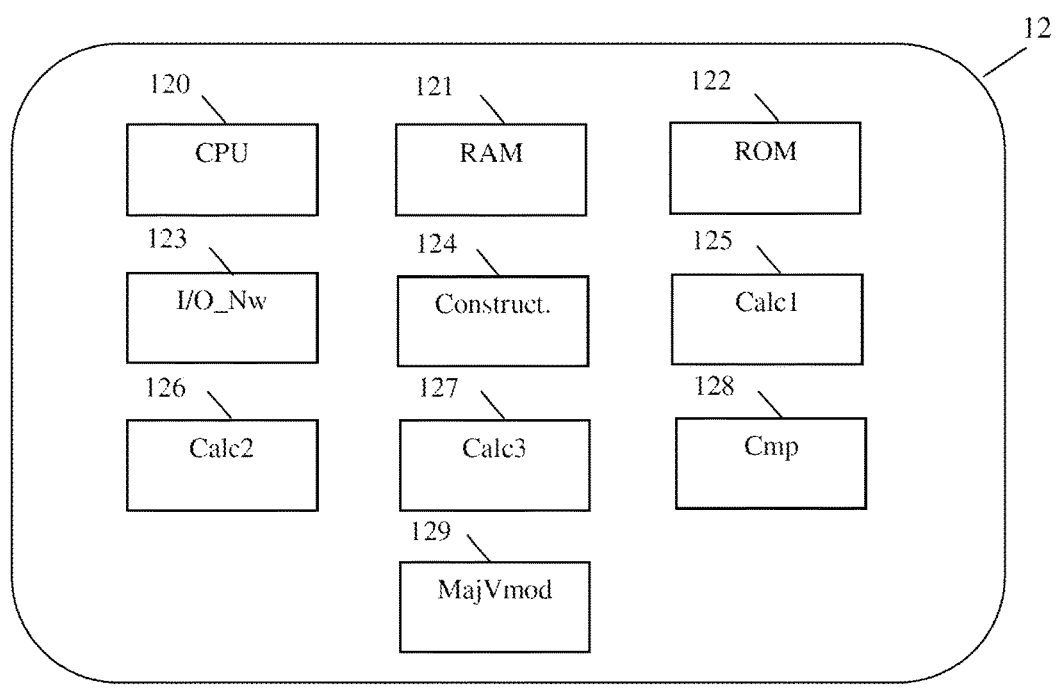
FIG. 3 is a schematic representation of network detection equipment implementing the method described in relation with FIGS. 1 and 2, according to one exemplary embodiment of the invention.

The detection device is a data processing unit of equipment, such as a terminal or a data processing server, designed to be placed in a network between a client device 11 and a server 10 capable of delivering a service to the client device 11 (the client device 11 and the server 10 are not shown in FIG. 3).

The detection device comprises:
- a microprocessor 120, or CPU (for Central Processing Unit), designed to load instructions into memory, to execute them, and to carry out operations;
- a set of memories, including a volatile memory 121, or RAM (for Random Access Memory) used for executing code instructions, storing variables, etc., a storage memory 122 of type ROM or EEPROM (for Read Only Memory and Electrically-Erasable Programmable Read-Only Memory). The storage memory 122 is configured for storing an application in memory which comprises code instructions for implementing the steps of the method for detecting anomalies in network traffic. The storage memory 122 is also configured for storing indicators calculated during the learning phase, in this case the model array, the standard deviation and the compliance interval. These indicators are intended to be used during the detection phase;
- network interfaces 123, arranged for communicating, on the one hand, with the client device 11, and on the other, with the server 10. More precisely, the detection device 12 acts as a controlled switch between these two pieces of equipment and is configured for receiving a request of a given type coming from the client device 11 and for receiving a response to the request of the given type coming from the server 10. The request and the response are received in the learning phase P0 and/or in the detection phase P1. The network interfaces 123 are arranged for implementing the reception E00 and response E01 steps of the learning phase P0, and interrogation E10 and response E11 steps of the detection phase P1 of the method previously described;
- a module 124 for constructing bit arrays, configured for constructing bit arrays based on responses received. The construction module 124 is thus adapted for constructing both the model bit array and also the subsequent bit arrays. The construction module 124 is configured for implementing the steps E03, E03', E03" for creating a bit array and E04, E04', E04" for calculating the array in the learning phase P0 of the method previously described. It is also configured for implementing the step E13 for modeling as a binary array in the detection phase of the method previously described;
- a first calculation module 125, configured for calculating similarity indices representative of distances between the model bit array and a subsequent or current bit array. The first calculation module 125 is implemented during the learning phase P0 and during the detection phase P1. The first calculation module 125 is configured for implementing the steps E06' and E06" for calculating a similarity index in the learning phase P0 and E17 for calculating a similarity index in the detection phase of the method previously described;
- a second calculation module 126, configured for calculating a mean of the similarity indices and a standard deviation between these indices. The second calculation module 126 is configured for implementing the step E07" for calculating the mean and standard deviation in the learning phase P0 of the method of detection previously described;
- a third calculation module 127, configured for calculating a compliance interval for a model bit array during the learning phase P0. For example, the compliance interval is calculated using a first variability threshold $T_{mod\_inf}$ and a second variability threshold $T_{mod\_sup}$, calculated according to the following formulae:

$$T_{mod\_inf} = M_{IS} - 3*\sigma_{IS}$$

$$T_{mod\_sup} = M_{IS} + 3*\sigma_{IS}$$

$$IC = [T_{mod\_inf}, T_{mod\_sup}],$$

where $M_{IS}$ represents a mean between several similarity indices and $\sigma_{IS}$ the standard deviation between these indices. The third calculation module 127 is configured for implementing the step E09" for calculating a compliance interval in the learning phase P0 of the method previously described;

a verification module 128, configured for checking that a similarity index calculated by the first calculation module 125 is included within the compliance interval IC, previously calculated by the second calculation module 126. The verification module 128 is configured for implementing the verification step E18 with regard to the compliance interval in the detection phase P1 of the method previously described;

a module 129 for updating the model array, configured for updating the model array constructed by the construction module 124, using a subsequent bit array. The updating module 129 is configured for implementing the steps E05' and E05" for updating the model array of the learning phase P0 of the method previously described;

The module 124 for constructing bit arrays, the first 125, second 126 and third 127 calculation modules, the verification module 128, and the module 129 for updating the model array are preferably software modules comprising program instructions for the execution of the steps of the method for detecting anomalies in network traffic previously described.

The invention therefore also relates to:

a computer program comprising instructions for the implementation of the anomaly detection method such as previously described when this program is executed by a processor of the detection device 12;

a readable recording medium on which the computer program described hereinabove is recorded.

The software modules may be stored in, or transmitted by, a data medium. The latter may be a hardware storage medium, for example a CD-ROM, a magnetic diskette or a hard disk, or else a transmission medium such as a telecommunications signal or network.

In one variant embodiment, the first 125, second 126 and third 127 calculation modules, the verification module 128 and the module 129 for updating the model array are defined as gates of a programmable logic circuit. One example of such a circuit is an FPGA (for Field-Programmable Gate Array) card.

The invention claimed is:

1. A method for detecting anomalies in network traffic, said traffic being transmitted by a server in response to requests from at least one client device, the method comprising:

a step for receiving a request, said request being of a given type, a step for receiving a response to the request, a step for constructing a current bit array, representative of the response, a step for calculating a similarity index representative of a distance between the current bit array and a model bit array associated with the type of the request, a step for verifying that the similarity index belongs to a compliance interval calculated for the type of request, an anomaly being detected when the similarity index does not belong to the compliance interval.

2. The method for detecting anomalies as claimed in claim 1, comprising a learning phase, the learning phase comprising:

a step for receiving an initial request, the initial request being of the given type, a step for receiving an initial response to the initial request, a step for constructing a model bit array, representative of the initial response, a step for updating the model array based on a subsequent bit array, constructed based on a next response received following a next request of the given type, a step for calculating a similarity index between the updated model array and the following bit array, the steps for updating and calculating the similarity index being iterated at least once, a step for calculating a mean of the calculated similarity indices and a standard deviation of these indices, a step for calculating the compliance interval based on the mean of the indices and on the standard deviation.

3. The method for detecting anomalies as claimed in claim 2, in which the compliance interval is defined by means of the mean $M_{IS}$ of the calculated similarity indices and of the standard deviation $\sigma_{IS}$ of these indices, according to the following formula:

$$IC=[M_{IS}-3*\sigma, M_{IS}+3*\sigma].$$

4. The method for detecting anomalies as claimed in claim 1, in which the construction of a bit array based on a response to a request comprises the following steps:

decomposition of the response into words composing it, calculation of a position Pj, 1≤j≤n, within the bit array, said position being associated with one of the words, by implementing the following steps:

conversion of said word into a binary form, obtaining the position Pj within the array by application modulo n of a hash function to said binary form obtained, and positioning the Pj-th bit at 1.

5. The method as claimed in claim 2, also comprising a filtering step during which a filtering bit array comprising a representation of a set of non-significant words is subtracted from the model array and from the following bit array prior to the updating of the model array based on the following bit array.

6. The method as claimed in claim 4, in which the size of the bit array is a number of bytes in the range between 4 Kbits and 400 Kbits.

7. The method as claimed in claim 6, in which an order of magnitude of the size of the bit array associated with the type of the request is 5% of a mean size of responses to requests of the given type.

8. The method as claimed in claim 2, in which the steps are implemented according to a given frequency over a given period.

9. The method as claimed in claim 2, in which a number of iterations of the steps is determined dynamically by comparing standard deviations obtained between an m-th iteration and the (m−1)-th and (m−2)-th iterations, with m>4, the number of iterations being sufficient when a variation of the standard deviations obtained is less than a given value.

10. The method as claimed in claim 2, comprising a step for comparison of the model bit array and the current bit array, implemented when the standard deviation calculated in the learning phase is equal to zero, an alarm being raised when the arrays are different.

11. A device for detection of anomalies in network traffic, said traffic being transmitted by a server in response to requests from a client device, the device comprising:

receiving means, intended to receive a request, said request being of a given type, and to receive a response to the request, construction means, intended to construct a current bit array representative of the response, calculation means, intended to calculate a similarity index representative of a distance between the current bit array and a model bit array associated with the type of the request, verification means, intended to verify that the similarity index does not belong to a compliance interval calculated for the type of request, an anomaly being detected when the similarity index does not belong to the compliance interval.

12. A hardware data recording medium on which a program is recorded, comprising instructions for implementation of steps of a method for detecting anomalies in network traffic, when the program is executed by a processor, wherein said traffic is transmitted by a server in response to requests from at least one client device, the method comprising:

a step for receiving a request, said request being of a given type, a step for receiving a response to the request, a step for constructing a current bit array, representative of the response, a step for calculating a similarity index representative of a distance between the current bit array and a model bit array associated with the type of the request, a step for verifying that the similarity index belongs to a compliance interval calculated for the type of request, an anomaly being detected when the similarity index does not belong to the compliance interval.

* * * * *